(12) United States Patent
Yamanaka

(10) Patent No.: US 9,837,845 B2
(45) Date of Patent: Dec. 5, 2017

(54) CHARGING CONTROLLING CIRCUIT AND CHARGING CONTROLLING SYSTEM

(71) Applicant: Kabushiki Kaisha Toshiba, Minato-Ku, Tokyo (JP)

(72) Inventor: Yuji Yamanaka, Atsugi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 593 days.

(21) Appl. No.: 14/184,052

(22) Filed: Feb. 19, 2014

(65) Prior Publication Data

US 2015/0069976 A1    Mar. 12, 2015

(30) Foreign Application Priority Data

Sep. 6, 2013   (JP) ................................ 2013-185627

(51) Int. Cl.
    *H02J 7/00*    (2006.01)

(52) U.S. Cl.
    CPC .......... *H02J 7/0072* (2013.01); *H02J 7/0078* (2013.01); *H02J 7/0093* (2013.01); *H02J 2007/0095* (2013.01); *Y02B 40/90* (2013.01)

(58) Field of Classification Search
    CPC ...... H02J 7/0068; H02J 7/0072; H02J 7/0078; H02J 7/0093; H02J 2007/0095
    See application file for complete search history.

(56) References Cited

U.S. PATENT DOCUMENTS

| 5,982,151 | A | 11/1999 | Nagai et al. |
| 6,452,364 | B1 * | 9/2002 | Saeki ..................... H02J 7/022 320/137 |
| 8,179,101 | B2 | 5/2012 | Umetsu et al. |
| 8,289,000 | B2 | 10/2012 | Nishida |

(Continued)

FOREIGN PATENT DOCUMENTS

| CN | 1270433 A | 10/2000 |
| CN | 102684301 A | 9/2012 |

(Continued)

OTHER PUBLICATIONS

Chinese Office Actoin dated Mar. 16, 2016 in corresponding Chinese Application No. 201410074802.7, along with English translation thereof.

(Continued)

*Primary Examiner* — Vuthe Siek
*Assistant Examiner* — Aric Lin
(74) *Attorney, Agent, or Firm* — White & Case LLP

(57) ABSTRACT

A charging controlling system includes an input terminal, an output terminal, a battery terminal, and a switch terminal. The charging controlling system includes a coil connected to the switch terminal at a first end thereof. The charging controlling system includes a resistor connected to a second end of the coil at a first end thereof and to the battery terminal at a second end thereof. The charging controlling system includes a capacitor connected between the second end of the coil and the ground. The charging controlling system includes a diode connected to the switch terminal at a cathode thereof and to the ground at an anode thereof. The charging controlling system includes a charging controlling circuit that controls charging of the battery.

6 Claims, 3 Drawing Sheets

(56) References Cited

U.S. PATENT DOCUMENTS

| | | | |
|---|---|---|---|
| 2001/0007417 A1* | 7/2001 | Kitagawa | H02J 7/0068 320/128 |
| 2002/0101748 A1 | 8/2002 | Loechner | |
| 2003/0126474 A1* | 7/2003 | Sawyers | G06F 1/30 713/300 |
| 2005/0017693 A1* | 1/2005 | Solie | H02J 7/0068 320/162 |
| 2005/0017766 A1* | 1/2005 | Formenti | G06F 1/263 327/110 |
| 2005/0189909 A1* | 9/2005 | Guthrie | G06F 1/263 320/107 |
| 2006/0119320 A1* | 6/2006 | Nork | H02J 7/0055 320/128 |
| 2006/0139002 A1* | 6/2006 | Zemke | H02J 7/0055 320/128 |
| 2007/0132427 A1* | 6/2007 | Veselic | H02J 7/0052 320/111 |
| 2009/0160500 A1 | 6/2009 | Niculae et al. | |
| 2011/0057625 A1 | 3/2011 | Ashida | |

FOREIGN PATENT DOCUMENTS

| | | |
|---|---|---|
| EP | 1043824 A2 | 10/2000 |
| EP | 2498166 A2 | 9/2012 |
| JP | 10-225006 A | 8/1998 |
| JP | 2000-299944 A | 10/2000 |
| JP | 3661904 B2 | 6/2005 |
| JP | 2006-191796 A | 7/2006 |
| JP | 2009-065772 A | 3/2009 |
| JP | 2010-093965 A | 4/2010 |
| JP | 2011-061986 A | 3/2011 |
| JP | 4766095 B2 | 9/2011 |
| JP | 2012-100374 A | 5/2012 |
| JP | 5057902 B2 | 10/2012 |

OTHER PUBLICATIONS

Japanese Office Action dated Dec. 18, 2015 in corresponding Japanese Application No. 2013-185627, along with English translation thereof.

* cited by examiner

CHARGING CONTROLLING CIRCUIT AND CHARGING CONTROLLING SYSTEM

CROSS-REFERENCE TO RELATED APPLICATION

This application is based upon and claims the benefit of priority from the prior Japanese Patent Application No. 2013-185627, filed on Sep. 6, 2013, the entire contents of which are incorporated herein by reference.

BACKGROUND

Field

Embodiments described herein relate generally to a charging control circuit and a charging control system.

Background Art

A conventional charging controlling system for an electronic device has two power paths, a path for charging a battery with electric power from a power supply, such as an AC adapter and an USB, and a path for supplying electric power to a system load.

DETAILED DESCRIPTION

Figure 1:
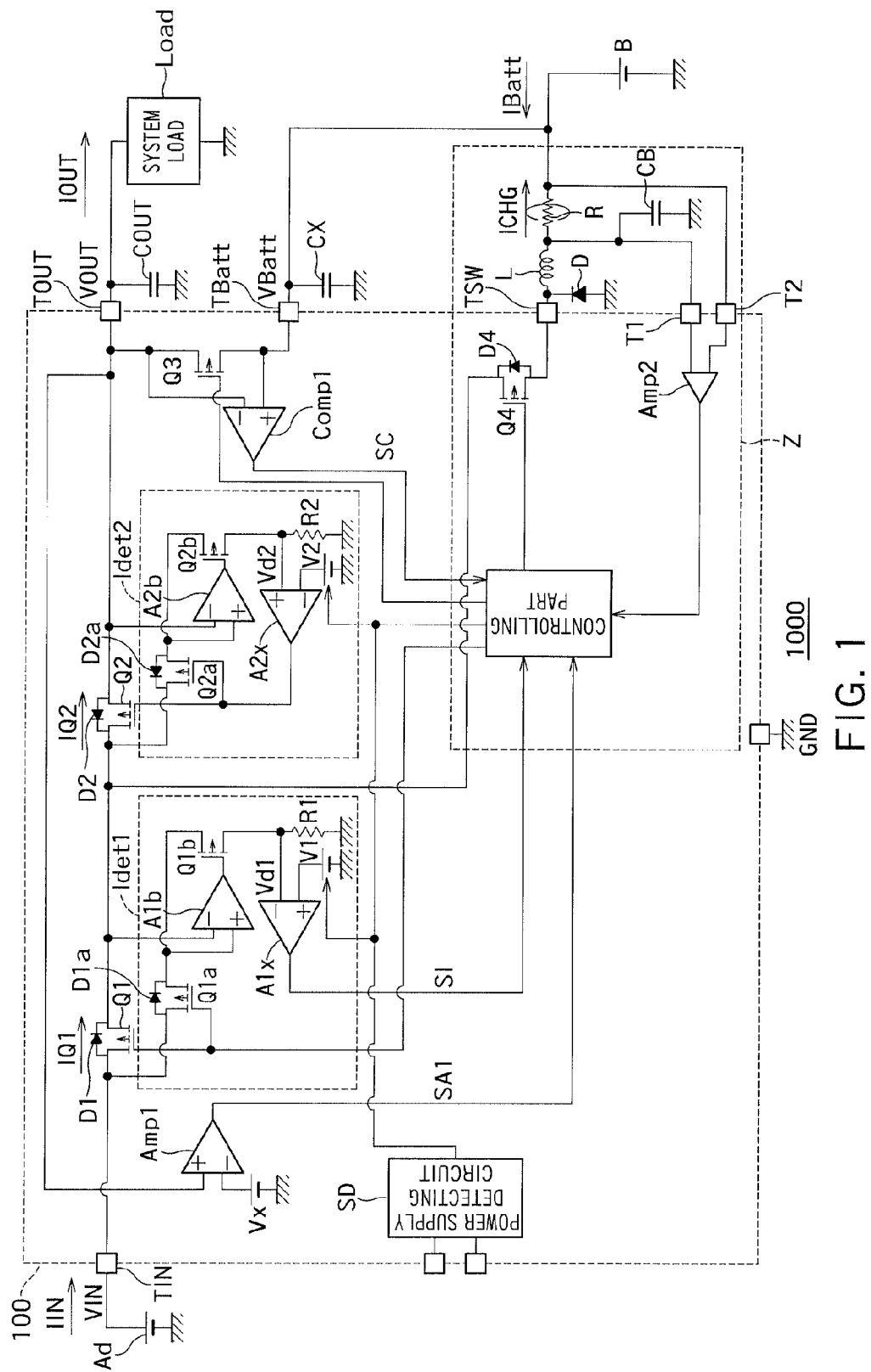
FIG. 1 is a circuit diagram showing an example of a configuration of a charging controlling system 1000 according to a first embodiment.

A charging controlling system according to an embodiment includes an input terminal to which a power supply is connected and a power supply voltage is supplied. The charging controlling system includes an output terminal to which a system load is connected and at which an output voltage is output. The charging controlling system includes a battery terminal to which a positive electrode of a battery, which is connected to a ground at a negative electrode thereof, is connected. The charging controlling system includes a switch terminal. The charging controlling system includes a coil connected to the switch terminal at a first end thereof. The charging controlling system includes a resistor connected to a second end of the coil at a first end thereof and to the battery terminal at a second end thereof. The charging controlling system includes a capacitor connected between the second end of the coil and the ground. The charging controlling system includes a diode connected to the switch terminal at a cathode thereof and to the ground at an anode thereof. The charging controlling system includes a charging controlling circuit that controls supply of a current to the system load and charging of the battery.

The charging controlling circuit includes a first input transistor connected to the input terminal at a first end of a current path thereof. The charging controlling circuit includes a second input transistor connected to a second end of the current path of the first input transistor at a first end of a current path thereof and to the output terminal at a second end of the current path thereof. The charging controlling circuit includes a first current detecting circuit that detects a first input current flowing through the first input transistor and outputs a current detection signal responsive to a difference between a value of the first input current and a first current threshold. The charging controlling circuit includes a second current detecting circuit that detects a second input current flowing through the second input transistor and controls the second input transistor so that a value of the second input current is equal to or lower than a second current threshold. The charging controlling circuit includes an output transistor connected to the second end of the first input transistor at a first end of a current path thereof and to the switch terminal at a second end of the current path thereof. The charging controlling circuit includes a controlling part that controls the first input transistor, the second input transistor and the output transistor.

In a state where the first input transistor is in an on state, the controlling part performs a PWM control on the output transistor so that a charging current flowing through the resistor is equal to a preset target current value in a case where the current detection signal indicates that the first input current is lower than the first current threshold, and performs the PWM control on the output transistor so that the value of the first input current is equal to or lower than the first current threshold in a case where the first input current reaches the first current threshold.

In the following, an embodiment will be described with reference to the drawings.

First Embodiment

FIG. 1 is a circuit diagram showing an example of a configuration of a charging controlling system 1000 according to a first embodiment.

As shown in FIG. 1, the charging controlling system 1000 includes an input terminal "TIN", an output terminal "TOUT", a battery terminal "TBatt", a switch terminal "TSW", a coil "L", a resistor "R", a capacitor "CB", a diode "D", an output capacitor "COUT", a smoothing capacitor "CX" and a charging controlling circuit 100.

A power supply "Ad" is connected between the input terminal "TIN" and a ground and supplies a power supply voltage "VIN". The power supply "Ad" is an AC adapter or a USB power supply, for example.

The output terminal "TOUT" is connected to a system load "Load", and an output voltage "VOUT" is output at the output terminal "TOUT".

The battery terminal "TBatt" is connected to a positive electrode of a battery "B", which is connected to the ground at a negative electrode thereof.

The coil "L" is connected to the switch terminal "TSW" at one end thereof.

The resistor "R" is connected to another end of the coil "L" at one end thereof and to the battery terminal "TBatt" at another end thereof.

The capacitor "CB" is connected between the another end of the coil "L" and the ground.

The diode "D" is connected to the switch terminal "TSW" at a cathode thereof and to the ground at an anode thereof. The diode "D" may be included in the charging controlling circuit 100.

The output capacitor "COUT" is connected between the output terminal "TOUT" and the ground.

The smoothing capacitor "CX" is connected between the battery terminal "TBatt" and the ground.

The charging controlling circuit 100 controls supply of a current to the system load "Load" and charging of the battery "B".

As shown in FIG. 1, the charging controlling circuit 100 includes a first input transistor (pMOS transistor) "Q1", a first input diode "D1", a second input transistor (pMOS transistor) "Q2", a second input diode "D2", a first current detecting circuit "Idet1", a second current detecting circuit "Idet2", an output transistor (pMOS transistor) "Q4", an output diode "D4", an auxiliary transistor (pMOS transistor) "Q3", a power supply detecting circuit "SD", a first amplifier "Amp1", a second amplifier "Amp2", a comparator "Comp1", and a controlling part "PC", for example.

The first input transistor "Q1" is connected to the input terminal "TIN" at one end (drain) of a current path thereof.

The first input diode "D1" is connected to the one end (drain) of the first input transistor "Q1" at an anode thereof and to another end (source) of the current path of the first input transistor "Q1" at a cathode thereof.

The second input transistor "Q2" is connected to the another end (source) of the first input transistor "Q1" at one end (source) of a current path thereof and to the output terminal "TOUT" at another end (drain) of the current path thereof.

The second input diode "D2" is connected to the one end (source) of the second input transistor "Q2" at a cathode thereof and to the another end (drain) of the second input transistor "Q2" at an anode thereof.

The first current detecting circuit "Idet1" detects a first input current "IQ1" flowing through the first input transistor "Q1" and outputs a current detection signal "SI" responsive to the difference between the value of the first input current "IQ1" and a first current threshold "th1".

The first input current ("IQ1") detected by the first current detecting circuit "Idet1" is a sum of a second input current (system current) "IQ2" and a charging current "ICHG" (that is, a current "IIN" from the power supply "Ad").

As shown in FIG. 1, the first current detecting circuit "Idet1" includes a first mirror transistor (pMOS transistor) "Q1a", a first mirror diode "D1a", a first current controlling transistor (pMOS transistor) "Q1b", a first current controlling amplifier "A1b", a first detecting resistor "R1", and a first current detecting amplifier "A1x", for example.

The first mirror transistor "Q1a" is connected to the one end (drain) of the first input transistor "Q1" at one end (drain) of a current path thereof and to a gate of the first input transistor "Q1" at a gate thereof. The first mirror transistor "Q1a" has a size equal to 1/N of that of the first input transistor "Q1" (N>1).

The first mirror diode "D1a" is connected to the one end (drain) of the first mirror transistor "Q1a" at an anode thereof and to another end (source) of the current path of the first mirror transistor "Q1a" at a cathode thereof.

The first current controlling transistor "Q1b" is connected to the another end (source) of the first mirror transistor "Q1a" at one end (source) of a current path thereof.

The first current controlling amplifier "A1b" controls the first current controlling transistor "Q1b" so that the voltage at the another end (source) of the first input transistor "Q1" is equal to the voltage at the another end (source) of the first mirror transistor "Q1a".

As a result, the first input transistor "Q1" and the first mirror transistor "Q1a" are controlled to have the same source voltage, the same drain voltage and the same gate voltage. Therefore, a current equal to 1/N of the first input current "IQ1" flowing through the first output transistor "Q1" flows through the first mirror transistor "Q1a".

The first detecting resistor "R1" is connected to another end (drain) of the current path of the first current controlling transistor "Q1b" at one end thereof and to the ground at another end thereof.

The first current detecting amplifier "A1x" receives a first reference voltage "V1" and a first detection voltage "Vd1" at the one end of the first detecting resistor "R1" and outputs the current detection signal "SI" responsive to the potential difference between the first reference voltage "V1" and the first detection voltage "Vd1".

The second current detecting circuit "Idet2" detects a second input current (system current) "IQ2" flowing through the second input transistor "Q2" and controls the second input transistor "Q2" so that the value of the second input current "IQ2" is equal to or lower than a second current threshold "th2".

That is, the second current detecting circuit "Idet2" limits the second input current "IQ2" by controlling the gate voltage of the second input transistor "Q2" if the second input current "IQ2" becomes equal to the second current threshold "th2".

In this way, if the system load "Load" still increases even if the charging current "ICHG" is decreased to 0, the second input current "IQ2" is limited, and the output voltage "VOUT" decreases.

As shown in FIG. 1, the second current detecting circuit "Idet2" includes a second mirror transistor (pMOS transistor) "Q2a", a second mirror diode "D2a", a second current controlling transistor (pMOS transistor) "Q2b", a second current controlling amplifier "A2b", a second detecting resistor "R2", and a second current detecting amplifier "A2x", for example.

The second mirror transistor "Q2a" is connected to the one end (source) of the second input transistor "Q2" at one end (source) of a current path thereof and to a gate of the second input transistor "Q2" at a gate thereof. The second mirror transistor "Q2a" has a size equal to 1/N of that of the second input transistor "Q2" (N>1).

The second mirror diode "D2a" is connected to the one end (source) of the second mirror transistor "Q2a" at a cathode thereof and to another end (drain) of the current path of the second mirror transistor "Q2a" at an anode thereof.

The second current controlling transistor "Q2b" is connected to the another end (drain) of the second mirror transistor "Q2a" at one end (source) of a current path thereof.

The second current controlling amplifier "A2b" controls the second current controlling transistor "Q2b" so that the voltage at the another end (drain) of the second input transistor "Q2" is equal to the voltage at the another end (drain) of the second mirror transistor "Q2a".

As a result, the second input transistor "Q2" and the second mirror transistor "Q2a" are controlled to have the same source voltage, the same drain voltage and the same gate voltage. Therefore, a current equal to 1/N of the second input current "IQ2" flowing through the second output transistor "Q2" flows through the second mirror transistor "Q2a".

The second detecting resistor "R2" is connected to another end of the current path of the second current controlling transistor "Q2b" at one end thereof and to the ground at another end thereof.

The second current detecting amplifier "A2x" controls the gate voltage of the second mirror transistor "Q2a" so that a second detection voltage "Vd2" at the one end of the second detecting resistor "R2" is equal to or lower than a second reference voltage "V2".

That is, the second current detecting amplifier "A2x" controls the second mirror transistor "Q2a" and the second output transistor "Q2" so that the second detection voltage "Vd2" at the one end of the second detecting resistor "R2" is equal to or lower than the second reference voltage "V2".

As a result, an upper limit value of the second input current "IQ2" flowing through the second output transistor "Q2" is determined by the second reference voltage "V2".

The output transistor "Q4" is connected to the another end (source) of the first input transistor "Q1" at one end (source) of a current path thereof and to the switch terminal "TSW" at another end (drain) of the current path thereof.

The output diode "D4" is connected to the one end (source) of the output transistor "Q4" at a cathode thereof and to the another end (drain) of the output transistor "Q4" at an anode thereof.

The auxiliary transistor "Q3" is connected to the output terminal "TOUT" at one end (source) of a current path thereof and to the battery terminal "TBatt" at another end (drain) of the current path thereof.

When the power supply "Ad" is connected, the power supply detecting circuit "SD" detects information on the USB specifications or the like and determines the power supply capability of the power supply "Ad" from the detection result.

The power supply detecting circuit "SD" performs such a control as to increase the first current threshold "th1" and the second current threshold "th2" if the power supply capability of the power supply "Ad" is equal to or higher than a preset determination threshold.

In other words, if the power supply capability of the power supply "Ad" is equal to or higher than the determination threshold, the power supply detecting circuit "SD" sets the first reference voltage "V1" in the first current detecting circuit "Idet1" at a first voltage value and sets the second reference voltage "V2" in the second current detecting circuit "Idet2" at a third voltage value.

On the other hand, if the power supply capability of the power supply "Ad" is lower than the determination threshold, the current detecting circuit "SD" decreases the first current threshold "th1" and the second current threshold "th2".

In other words, if the power supply capability of the power supply "Ad" is lower than the determination threshold, the power supply detecting circuit "SD" sets the first reference voltage "V1" in the first current detecting circuit "Idet1" at a second voltage value lower than the first voltage value and sets the second reference voltage "V2" in the second current detecting circuit "Idet2" at a fourth voltage value lower than the third voltage value.

In addition, as shown in FIG. 1, the first amplifier "Amp1" receives the output voltage "VOUT" and an output reference voltage "Vx" and outputs a first amplified signal "SA1" responsive to the potential difference between the output voltage "VOUT" and the output reference voltage "Vx".

The second amplifier "Amp2" receives the voltage at the one end of the resistor "R" and the voltage at the another end of the resistor "R" via terminals "T1" and "T2" and outputs a second amplified signal "SA2" responsive to the potential difference between the voltage at the one end of the resistor "R" and the voltage at the another end of the resistor "R".

The comparator "Comp1" receives the output voltage "VOUT" and a battery voltage "VBatt" and outputs a comparison result signal "SC" responsive to a result of comparison between the output voltage "VOUT" and the battery voltage "VBatt".

The controlling part "PC" controls the first input transistor "Q1", the second input transistor "Q2", the auxiliary transistor "Q3" and the output transistor "Q4" based on the first amplified signal "SA1", the second amplified signal "SA2", the comparison result signal "SC" and the current detection signal "SI".

The controlling part "PC", the output transistor "Q4", the second amplifier "Amp2", the coil "L", the resistor "R", the capacitor "CB" and the diode "D" form a DC-DC converter "Z".

For example, in a case where the power supply "Ad" supplies the power supply voltage "VIN", the controlling part "PC" turns on the first input transistor "Q1".

In the state where the first input transistor "Q1" is turned on, if the current detection signal "SI" indicates that the first input current "IQ1" is lower than the first current threshold "th1", the controlling part "PC" performs a PWM control on the output transistor "Q4" so that the charging current "ICHG" flowing through the resistor "R" is equal to a preset target current value. According to this embodiment, in particular, the controlling part "PC" performs the PWM control on the output transistor "Q4" based on the second amplified signal "SA2" so that the charging current "ICHG" is equal to the preset target current value.

On the other hand, in the state where the first input transistor "Q1" is turned on, if the current detection signal "SI" indicates that the first input current "IQ1" has reached the first current threshold "th1", the controlling part "PC" performs the PWM control on the output transistor "Q4" so that the value of the first input current "IQ1" is equal to or lower than the first current threshold "th1", In this case, the controlling part "PC" controls the output transistor "Q4" according to the current detection signal "SI" so that the first detection voltage "Vd1" is equal to or lower than the first reference voltage "V1" in the first current detecting circuit "Idet1".

In this way, if the first input current "IQ1" reaches the first current threshold "th1" because of an increase of the system load "Load", the duty cycle of the PWM control on the output transistor "Q4" is controlled to decrease the charging current "ICHG". The current allocated to the system load "Load" increases according to the decrement of the charging current "ICHG".

In a case where the output voltage "VOUT" is higher than the battery voltage "VBatt" of the battery "B", the controlling part "PC" turns off the auxiliary transistor "Q3". According to this embodiment, in particular, the controlling part "PC" turns off the auxiliary transistor "Q3" if the comparison result signal "SC" indicates that the output voltage "VOUT" is higher than the battery voltage "VBatt" of the battery "B".

On the other hand, in a case where the output voltage "VOUT" is equal to or lower than the battery voltage "VBatt" of the battery "B", the controlling part "PC" turns on the auxiliary transistor "Q3". According to this embodiment, in particular, the controlling part "PC" turns on the auxiliary transistor "Q3" if the comparison result signal "SC" indicates that the output voltage "VOUT" is equal to or lower than the battery voltage "VBatt" of the battery "B".

In this way, when the output voltage "VOUT" decreases because of an increase of the system load "Load" or the output voltage "VOUT" decreases to be equal to or lower than the battery voltage "VBatt" as a result of removal of the power supply "Ad" from the charging controlling circuit 100, the auxiliary transistor "Q3" can be instantaneously turned on to feed electric power from the battery "B" to maintain the system voltage.

Normally, for example, based on a detection result from the power supply detecting circuit "SD", a voltage drop of the power supply is prevented by imposing an input current limitation of the first current threshold "th1" (second current threshold "th2") equal to or lower than an output current limitation of the power supply "Ad". However, if the power supply capability is unexpectedly low, the auxiliary transistor "Q3" is turned on to feed electric power from the battery "B" to maintain the system voltage.

If the output voltage "VOUT" is higher than the preset output reference voltage "Vx", the controlling part "PC" performs the PWM control on the output transistor "Q4" so that the charging current "ICHG" is equal to the target current value. According to this embodiment, in particular, the controlling part "PC" performs the PWM control on the output transistor "Q4" so that the charging current "ICHG" is equal to the target current value if the first amplified signal "SA1" indicates that the output voltage "VOUT" is higher than the preset output reference voltage "Vx".

On the other hand, if the output voltage "VOUT" is equal to or lower than the output reference voltage "Vx", the controlling part "PC" performs the PWM control on the output transistor "Q4" so as to decrease the charging current "ICHG". According to this embodiment, in particular, the controlling part "PC" performs the PWM control on the output transistor "Q4" so as to decrease the charging current "ICHG" if the first amplified signal "SA1" indicates that the output voltage "VOUT" is equal to or lower than the output reference voltage "Vx".

If the auxiliary transistor "Q3" is turned off, the controlling part "PC" performs a control so that the first current threshold "th1" and the second current threshold "th2" are equal to each other.

If the auxiliary transistor "Q3" is turned on, the controlling part "PC" performs a control so that the second current threshold "th2" decreases.

If the auxiliary transistor "Q3" is turned on, an excessive electric power ((input voltage "VIN"–battery voltage "VBAT")×second input current "IQ2") is applied between the source and the drain of the second input transistor "Q2". Thus, if the auxiliary transistor "Q3" is turned on, the second current threshold "th2" is decreased to decrease the second input current "IQ2", thereby reducing heat generation of the second input transistor "Q2".

Although the transistors are pMOS transistors in the example shown in FIG. 1, the transistors may be nMOS transistors. Alternatively, the transistors may be bipolar transistors.

Next, an example of an operation of the charging controlling circuit 100 configured as described above will be described.

Figure 2:
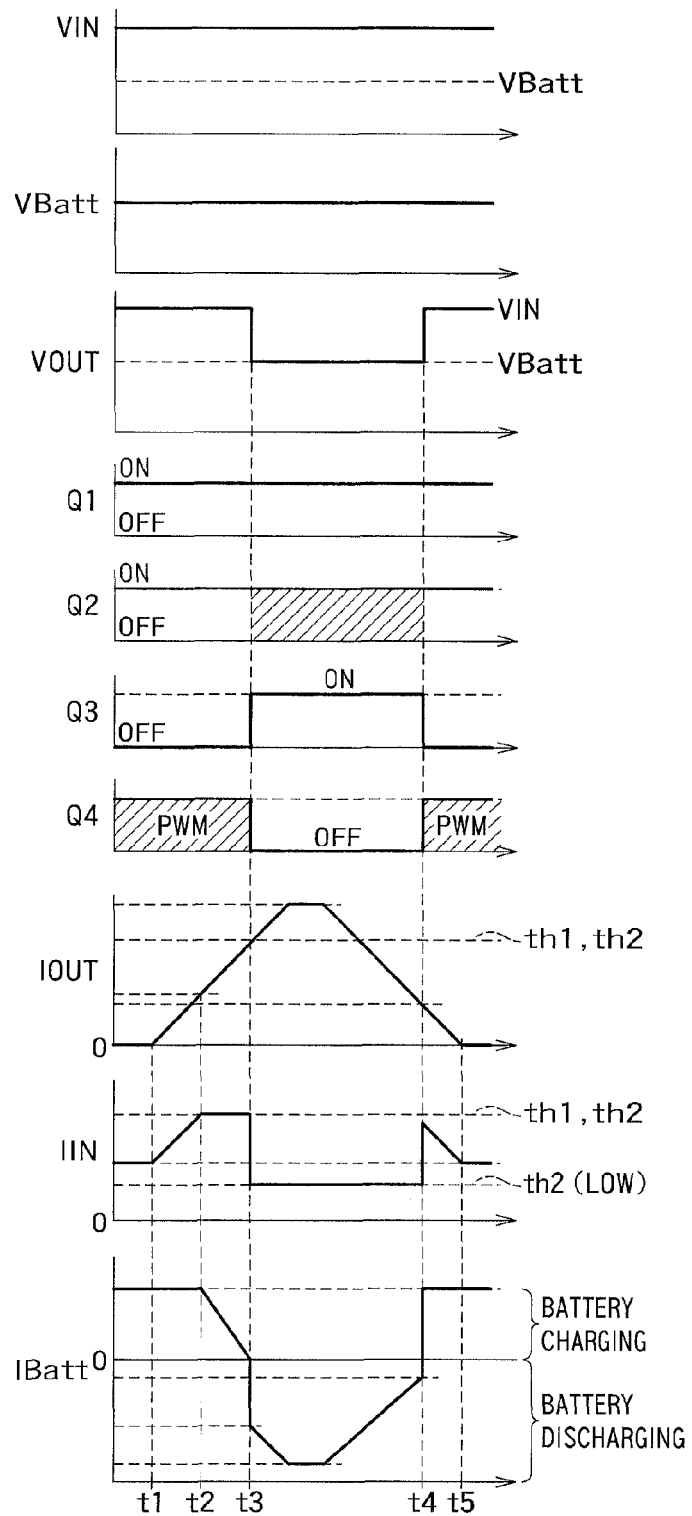
FIG. 2 is a waveform diagram showing examples of signals involved in the operation of the charging controlling circuit 100 shown in FIG. 1 in the case where the power supply capability of the power supply "Ad" is high.

First, an example of an operation of the charging controlling circuit 100 in the case where the power supply capability of the power supply "Ad" is high will be described. FIG. 2 is a waveform diagram showing examples of signals involved in the operation of the charging controlling circuit 100 shown in FIG. 1 in the case where the power supply capability of the power supply "Ad" is high.

As shown in FIG. 2, before a time "t1", the power supply "Ad" is supplying the power supply voltage "VIN", so that the first input transistor "Q1" is in the on state. In addition, under the control of the second current detecting circuit "Idet2", the second output transistor "Q2" is also in the on state. However, since the output voltage "VOUT" is higher than the battery voltage, the auxiliary transistor "Q3" is in the off state. Since the current "IIN" (first input current "IQ1") is lower than the first current threshold "th1", the PWM control on the output transistor "Q4" occurs so that charging current "ICHG" flowing through the resistor "R" is equal to the preset target current value.

At the time "t1", the output current "IOUT" at the output terminal "TOUT" increases because of an increase of the system load "Load". At this point in time, since the current "IIN" (first input current "IQ1") is lower than the first current threshold "th1", the PWM control on the output transistor "Q4" occurs so that charging current "ICHG" flowing through the resistor "R" is equal to the preset target current value.

At a time "t2", the first input current "IQ1" reaches the first current threshold "th1", and the PWM control on the output transistor "Q4" then occurs so that the value of the first input current "IQ1" is equal to or lower than the first current threshold "th1". And the battery "B" is then charged until a charging current "IBatt" is equal to zero (until a time "t3").

At the time "t3", the output voltage "VOUT" becomes equal to or lower than the battery voltage "VBatt" of the battery "B", and the auxiliary transistor "Q3" is turned on. In response to this, the battery "B" discharges.

In this way, when the output voltage "VOUT" decreases because of an increase of the system load "Load" or the output voltage "VOUT" decreases to be equal to or lower than the battery voltage "VBatt" as a result of removal of the power supply "Ad" from the charging controlling circuit 100, the auxiliary transistor "Q3" can be instantaneously turned on to feed electric power from the battery "B" to maintain the system voltage.

At this point in time, since the auxiliary transistor "Q3" is turned on as described above, the second current threshold "th2" is adjusted to decrease. As a result, the second input current "IQ2" is reduced, and heat generation of the second input transistor "Q2" is reduced (from the time "t3" to a time "t4").

At the time "t4", if the output voltage "VOUT" is higher than the battery voltage "VBatt", the auxiliary transistor "Q3" is turned off. Since the auxiliary transistor "Q3" is turned off, the second current threshold "th2" is adjusted to be equal to the first current threshold "th1" (to be restored to the original value).

At this point in time, since the current "TIN" (first input current "IQ1") is lower than the first current threshold "th1", the PWM control on the output transistor "Q4" occurs so that the charging current "ICHG" flowing through the resistor "R" is equal to the preset target current value.

After that, the same operation is repeated.

Figure 3:
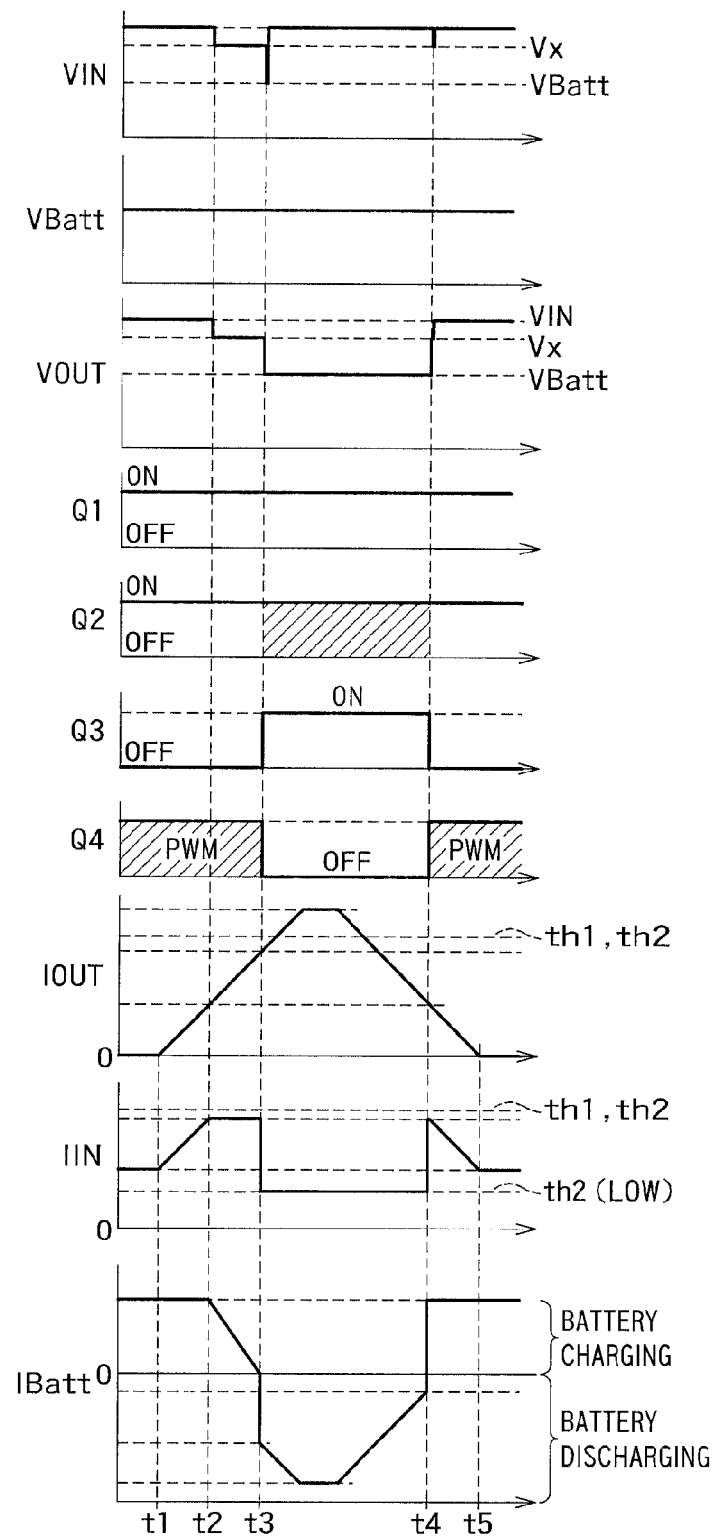
FIG. 3 is a waveform diagram showing examples of signals involved in the operation of the charging controlling circuit 100 shown in FIG. 1 in the case where the power supply capability of the power supply "Ad" is low.

Next, an example of an operation of the charging controlling circuit 100 in the case where the power supply capability of the power supply "Ad" is low will be described. FIG. 3 is a waveform diagram showing examples of signals involved in the operation of the charging controlling circuit 100 shown in FIG. 1 in the case where the power supply capability of the power supply "Ad" is low.

As shown in FIG. 3, as in the case shown in FIG. 2, before the time "t1", the power supply "Ad" is supplying the power supply voltage "VIN", so that the first input transistor "Q1" is in the on state. In addition, under the control of the second current detecting circuit "Idet2", the second output transistor "Q2" is also in the on state. However, since the output voltage "VOUT" is higher than the battery voltage, the auxiliary transistor "Q3" is in the off state. Since the current "IIN" (first input current "IQ1") is lower than the first current threshold "th1", the PWM control on the output transistor "Q4" occurs so that charging current "ICHG" flowing through the resistor "R" is equal to the preset target current value.

At the time "t1", the output current "IOUT" at the output terminal "TOUT" increases because of an increase of the system load "Load". At this point in time, since the current "IIN" (first input current "IQ1") is lower than the first current threshold "th1", the PWM control on the output transistor "Q4" occurs so that charging current "ICHG" flowing through the resistor "R" is equal to the preset target current value.

At the time "t2", the output voltage "VOUT" decreases to be lower than the output reference voltage "Vx", and the PWM control on the output transistor "Q4" then occurs so that the charging current "ICHG" decreases. And the battery "B" is then charged until the charging current "IBatt" is equal to zero (until the time "t3").

At the time "t3", the output voltage "VOUT" becomes equal to or lower than the battery voltage "VBatt" of the battery "B", and the auxiliary transistor "Q3" is turned on. In response to this, the battery "B" discharges.

In this way, as in the case shown in FIG. 2, when the output voltage "VOUT" decreases because of an increase of the system load "Load" or the output voltage "VOUT" decreases to be equal to or lower than the battery voltage "VBatt" as a result of removal of the power supply "Ad" from the charging controlling circuit 100, the auxiliary transistor "Q3" can be instantaneously turned on to feed electric power from the battery "B" to maintain the system voltage.

At this point in time, since the auxiliary transistor "Q3" is turned on as described above, the second current threshold "th2" is adjusted to decrease. As a result, the second input current "IQ2" is reduced, and heat generation of the second input transistor "Q2" is reduced (from the time "t3" to the time "t4").

At the time "t4", if the output voltage "VOUT" is higher than the battery voltage "VBatt", the auxiliary transistor "Q3" is turned off. Since the auxiliary transistor "Q3" is turned off, the second current threshold "th2" is adjusted to be equal to the first current threshold "th1" (to be restored to the original value).

At this point in time, since the current "IIN" (first input current "IQ1") is lower than the first current threshold "th1", the PWM control on the output transistor "Q4" occurs so that the charging current "ICHG" flowing through the resistor "R" is equal to the preset target current value.

After that, the same operation is repeated.

As described above, the charging controlling circuit according to the first embodiment can improve the charging efficiency.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A charging controlling system, comprising:
an input terminal to which a power supply is connected and a power supply voltage is supplied;
an output terminal to which a system load is connected and at which an output voltage is output;
a battery terminal to which a positive electrode of a battery, which is connected to a ground at a negative electrode thereof, is connected;
a switch terminal;
a coil connected to the switch terminal at a first end thereof;
a resistor connected to a second end of the coil at a first end thereof and to the battery terminal at a second end thereof;
a capacitor connected between the second end of the coil and the ground;
a diode connected to the switch terminal at a cathode thereof and to the ground at an anode thereof; and
a charging controlling circuit that controls supply of a current to the system load and charging of the battery,
wherein the charging controlling circuit comprises:
a first input transistor connected to the input terminal at a first end of a current path of the first input transistor;
a second input transistor connected to a second end of the current path of the first input transistor at a first end of a current path of the second input transistor and to the output terminal at a second end of the current path of the second input transistor;
a first current detecting circuit that detects a first input current flowing through the first input transistor and outputs a current detection signal responsive to a difference between a value of the first input current and a first current threshold;
a second current detecting circuit that detects a second input current flowing through the second input transistor and controls the second input transistor so that a value of the second input current is equal to or lower than a second current threshold;
an output transistor connected to the second end of the first input transistor at a first end of a current path of the output transistor and to the switch terminal at a second end of the current path of the output transistor; and
a controlling part that controls the first input transistor, the second input transistor and the output transistor,
wherein in a state where the first input transistor is in an on state,
the controlling part
performs a PWM control on the output transistor so that a charging current flowing through the resistor is equal to a target current value in a case where the current detection signal indicates that the first input current is lower than the first current threshold, and
performs the PWM control on the output transistor so that the value of the first input current is equal to or lower than the first current threshold in a case where the first input current reaches the first current threshold,
wherein the first current detecting circuit comprises:
a first mirror transistor that is connected to the first end of the first input transistor at a first end of a current path of the first mirror transistor and to a gate of the first input transistor at a gate thereof and has a size equal to 1/N of a size of the first input transistor (N>1);
a first current controlling transistor connected to a second end of the current path of the first mirror transistor at a first end of a current path of the first current controlling transistor;
a first current controlling amplifier that controls the first current controlling transistor so that a voltage at the second end of the first input transistor is equal to a voltage at the second end of the first mirror transistor;

a first detecting resistor connected to a second end of the first current controlling transistor at a first end thereof and to the ground at a second end thereof; and a first current detecting amplifier that receives a first reference voltage and a first detection voltage at the first end of the first detecting resistor and outputs the current detection signal responsive to a potential difference between the first reference voltage and the first detection voltage, and the controlling part controls the output transistor according to the current detection signal so that the first detection voltage is equal to or lower than the first reference voltage.

2. The charging controlling system according to claim 1, wherein the charging controlling circuit further comprises an auxiliary transistor connected to the output terminal at a first end of a current path of the auxiliary transistor and to the battery terminal at a second end of the current path of the auxiliary transistor, wherein the controlling part turns off the auxiliary transistor in a case where the output voltage is higher than a battery voltage of the battery, and turns on the auxiliary transistor in a case where the output voltage is equal to or lower than the battery voltage of the battery.

3. The charging controlling system according to claim 2, wherein the controlling part performs the PWM control on the output transistor so that the charging current is equal to the target current value in a case where the output voltage is higher than an output reference voltage, and performs the PWM control on the output transistor so that the charging current decreases in a case where the output voltage is lower than the output reference voltage.

4. The charging controlling system according to claim 1, wherein the charging controlling circuit further comprises a power supply detecting circuit that increases the first current threshold and the second current threshold in a case where a power supply capability of the power supply is equal to or higher than a determination threshold, and decreases the first current threshold and the second current threshold in a case where the power supply capability of the power supply is lower than the determination threshold.

5. The charging controlling system according to claim 1, wherein the charging controlling circuit sets the first reference voltage at a first voltage value in a case where a power supply capability of the power supply is equal to or higher than a determination threshold, and sets the first reference voltage at a second voltage value lower than the first voltage value in a case where the power supply capability of the power supply is lower than the determination threshold.

6. The charging controlling system according to claim 2, wherein the controlling part performs a control so that the first current threshold and the second current threshold are equal to each other in a case where the auxiliary transistor is turned off, and performs a control so that the second current threshold decreases in a case where the auxiliary transistor is turned on.

\* \* \* \* \*